(12) United States Patent
Cordeiro et al.

(10) Patent No.: US 12,311,930 B2
(45) Date of Patent: May 27, 2025

(54) VEHICULAR DRIVING ASSISTANCE SYSTEM WITH ENHANCED TRAFFIC LANE DETERMINATION

(71) Applicant: Magna Electronics Inc., Auburn Hills, MI (US)

(72) Inventors: Alan M. Cordeiro, Farmington Hills, MI (US); Tejas Murlidhar Varunjikar, Troy, MI (US); Mayank Hitesh Desai, Novi, MI (US); Harold E. Joseph, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 354 days.

(21) Appl. No.: 17/811,312

(22) Filed: Jul. 8, 2022

(65) Prior Publication Data

US 2023/0008230 A1    Jan. 12, 2023

Related U.S. Application Data

(60) Provisional application No. 63/203,123, filed on Jul. 9, 2021.

(51) Int. Cl.
*B60W 30/12* (2020.01)
*B60W 10/20* (2006.01)
(Continued)

(52) U.S. Cl.
CPC ......... *B60W 30/12* (2013.01); *B60W 10/20* (2013.01); *B60W 50/0205* (2013.01);
(Continued)

(58) Field of Classification Search
None
See application file for complete search history.

(56) References Cited

U.S. PATENT DOCUMENTS 5,550,677 A    8/1996 Schofield et al.
5,670,935 A    9/1997 Schofield et al.
(Continued)

FOREIGN PATENT DOCUMENTS

EP    3360746 A1    8/2018

OTHER PUBLICATIONS

Snider J.M., "Automatic Steering Methods for Autonomous Automobile Path Tracking", Feb. 2009, CMU thesis.
(Continued)

*Primary Examiner* — Hunter B Lonsberry
*Assistant Examiner* — Robert L Pinkerton
(74) *Attorney, Agent, or Firm* — HONIGMAN LLP

(57) ABSTRACT

A vehicular driver assistance system includes a front camera module (FCM) disposed at a vehicle. The system, responsive to processing captured image data, generates FCM lane information including information regarding a traffic lane the vehicle is currently traveling along. An e-Horizon module (EHM) generates EHM lane information including information regarding the traffic lane the vehicle is currently traveling along. The vehicular driver assistance system determines an FCM correlation using the FCM lane information and sensor data captured by at least one exterior sensor. The vehicular driver assistance system determines an EHM correlation using the EHM lane information and the sensor data captured by the at least one exterior sensor. Responsive to determining the FCM correlation and the EHM correlation, the system controls lateral movement of the vehicle based on one selected from the group consisting of (i) the FCM lane information and (ii) the EHM lane information.

24 Claims, 4 Drawing Sheets

(51) Int. Cl.
    *B60W 50/02* (2012.01)
    *B60W 50/029* (2012.01)
    *G06V 20/56* (2022.01)

(52) U.S. Cl.
    CPC ......... *B60W 50/029* (2013.01); *G06V 20/588* (2022.01); *B60W 2050/0215* (2013.01); *B60W 2050/0292* (2013.01); *B60W 2420/403* (2013.01); *B60W 2510/202* (2013.01); *B60W 2540/18* (2013.01); *B60W 2552/53* (2020.02); *B60W 2556/20* (2020.02); *B60W 2556/35* (2020.02)

(56) References Cited

U.S. PATENT DOCUMENTS

| | | |
|---|---|---|
| 5,949,331 A | 9/1999 | Schofield et al. |
| 6,580,986 B1 | 6/2003 | Uenuma et al. |
| 6,690,268 B2 | 2/2004 | Schofield et al. |
| 6,824,281 B2 | 11/2004 | Schofield et al. |
| 6,882,287 B2 | 4/2005 | Schofield |
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 9,180,908 B2 | 11/2015 | Van Dan Elzen et al. |
| 9,340,227 B2 | 5/2016 | Bajpai |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 9,988,047 B2 | 6/2018 | Johnson et al. |
| 10,032,369 B2 | 7/2018 | Koravadi |
| 10,055,651 B2 | 8/2018 | Chundrlik, Jr. et al. |
| 10,071,687 B2 | 9/2018 | Ihlenburg et al. |
| 10,099,614 B2 | 10/2018 | Diessner |
| 10,268,904 B2 | 4/2019 | Gupta |
| 10,315,651 B2 | 6/2019 | Fiaschetti et al. |
| 10,449,899 B2 | 10/2019 | Gupta et al. |
| 10,583,779 B2 | 3/2020 | Koravadi |
| 11,608,112 B2 * | 3/2023 | Okouneva ............ B60D 1/245 |
| 11,648,943 B2 * | 5/2023 | Lee ................. B60W 30/12 701/41 |
| 2009/0295181 A1 | 12/2009 | Lawlor et al. |
| 2011/0010054 A1 | 1/2011 | Wilson-Jones et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0327398 A1 | 11/2015 | Achenbach et al. |
| 2016/0159394 A1 | 6/2016 | Ryu et al. |
| 2019/0315363 A1 * | 10/2019 | Kim ................ B60W 40/06 |
| 2020/0114933 A1 * | 4/2020 | Ono ............... B60W 60/0059 |
| 2021/0316728 A1 * | 10/2021 | Won ............... B60W 30/162 |
| 2021/0354637 A1 * | 11/2021 | Hwang ............. H04N 23/661 |
| 2022/0048504 A1 | 2/2022 | Prasad Challa et al. |
| 2022/0048509 A1 | 2/2022 | Prasad Challa |
| 2022/0048566 A1 | 2/2022 | Prasad Challa et al. |
| 2022/0108117 A1 | 4/2022 | Potnis |
| 2022/0114374 A1 | 4/2022 | Khatri |
| 2022/0135030 A1 | 5/2022 | Varunjikar et al. |
| 2022/0176960 A1 | 6/2022 | Awathe et al. |
| 2022/0363250 A1 | 11/2022 | Varunjikar et al. |
| 2022/0410916 A1 | 12/2022 | Cordeiro et al. |
| 2023/0009269 A1 * | 1/2023 | Prasad ............. B60W 30/12 |

OTHER PUBLICATIONS

Werling et al., Invariant Trajectory Tracking With a Full-Size Autonomous Road Vehicle, IEEE, vol. 26, No. 4, Aug. 2010.
Werling et al., Optimal trajectories for time-critical street scenarios using discretized terminal manifolds, The International Journal of Robotics Research, Mar. 2012.

* cited by examiner

| Case | FCM vs SVC correlation status | EH vs SVC correlation status | Road Fusion Sources to be considered |
|---|---|---|---|
| 1 | Within threshold | Within threshold | FCM (default) |
| 2 | Outside threshold | Within threshold | Only EH |
| 3 | Within threshold | Outside threshold | Only FCM |
| 4 | Outside threshold | Outside threshold | FCM (default) |

FIG. 4

VEHICULAR DRIVING ASSISTANCE SYSTEM WITH ENHANCED TRAFFIC LANE DETERMINATION

CROSS REFERENCE TO RELATED APPLICATION

The present application claims the filing benefits of U.S. provisional application Ser. No. 63/203,123, filed Jul. 9, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle includes a front camera module (FCM) disposed at a vehicle equipped with the vehicular driver assistance system and viewing exterior of the vehicle. The FCM includes a camera that captures image data. The system includes an image processor for processing image data captured by the camera, and the system, responsive to processing the image data, generates FCM lane information that includes information regarding the traffic lane the vehicle is currently traveling along. The system also includes an e-Horizon module that includes one or more localization sensors. The e-Horizon module (EHM) generates EHM lane information that includes information regarding the traffic lane the vehicle is currently traveling along. The system includes at least one other sensor (e.g., another camera or radar sensor or lidar sensor or the like) disposed exterior of the vehicle and at least partially viewing the traffic lane the vehicle is currently traveling along. The at least one other sensor may comprise a camera for a surround view vision system of the vehicle. The at least one other sensor captures sensor data. The system determines, using the FCM lane information and sensor data captured by the at least one other sensor, an FCM correlation. The system also determines, using the EHM lane information and the sensor data captured by the at least one other sensor, an EHM correlation. The system controls, based on the FCM correlation and the EHM correlation, lateral movement of the vehicle based on one selected from the group consisting of (i) the FCM lane information and (ii) the EHM lane information. The image processor may be part of the FCM or may be part of an electronic control unit of the system or vehicle. The sensor data captured by the at least one other sensor may be processed at a data processor and/or at an electronic control unit of the system or vehicle.

These and other objects, advantages, purposes and features of the present invention will become apparent upon review of the following specification in conjunction with the drawings.

BRIEF DESCRIPTION OF THE DRAWINGS

FIG. 4 is a table of arbitration decisions for the system of FIG. 1 in different scenarios.

DESCRIPTION OF THE PREFERRED EMBODIMENTS

A vehicle vision system and/or driver or driving assist operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
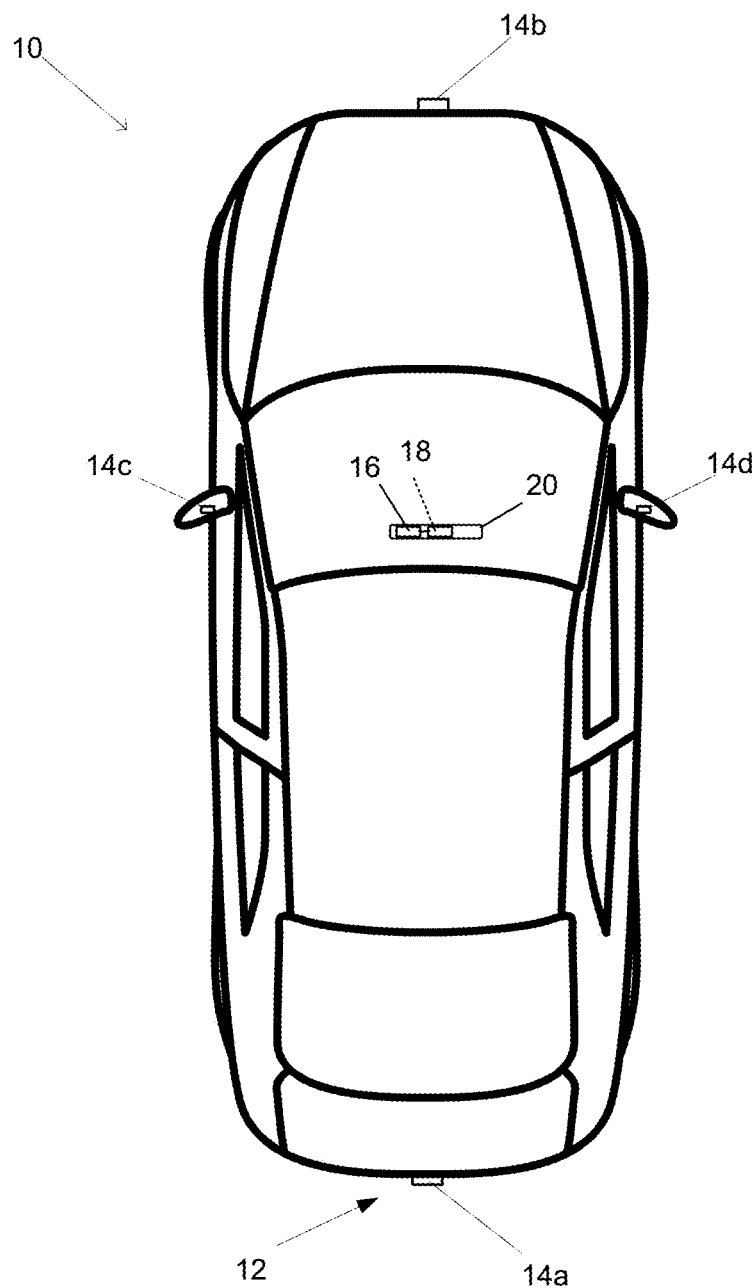
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. Optionally, some or all of the processing functionality to determine/generate lane markings is performed by the camera processor and/or a central Advanced Driver Assistance System (ADAS) module. That is, an image processor of the camera may perform some or all of the processing of the captured image data to generate the lane markings information. Alternatively or additionally, a central ADAS module or controller receives raw image information from the camera processes the raw image information to generate the lane markings information.

Advanced Driver Assistance Systems often obtain information regarding the surrounding environment through different sensors such as a front camera module (FCM), radar modules, LiDAR modules, e-Horizon (EH) modules (EHM), etc. This information may be used by various features (e.g. adaptive cruise control, lane centering, etc.) to assist the driver while driving or operating a vehicle (or for use in autonomously maneuvering the vehicle along the road). Features such as lane centering can use information from the FCM and/or EHM to assist in providing lateral control of the vehicle. For example, lane centering involves steering the vehicle autonomously to keep the vehicle centered in the driving traffic lane.

The ADAS software executing on an ADAS controller (e.g., an ECU) may calculate actuation (output control) commands to control the vehicle continuously based on the sensor inputs. For instance, both FCM and EHM sensors may provide redundant traffic lane information such that when one of them fails to provide traffic lane information, the other sensor can still provide the information necessary to perform lateral motion control. However, when both sensors report valid status but have a significant difference in the traffic lane information provided such that the traffic lane information reported by the two sensors is incompatible, it may be difficult to discern which sensor to trust. For example, the FCM indicates that its output is valid and that the vehicle should move to the right to center the vehicle in the traffic lane while the EH module also indicates that its output is valid and that the vehicle should move to the left to center the vehicle in the traffic lane. In situations such as this, the system must decide which sensor's data to use. As described herein, a third sensor may identify which of the two data sources is best to use.

Figure 2:
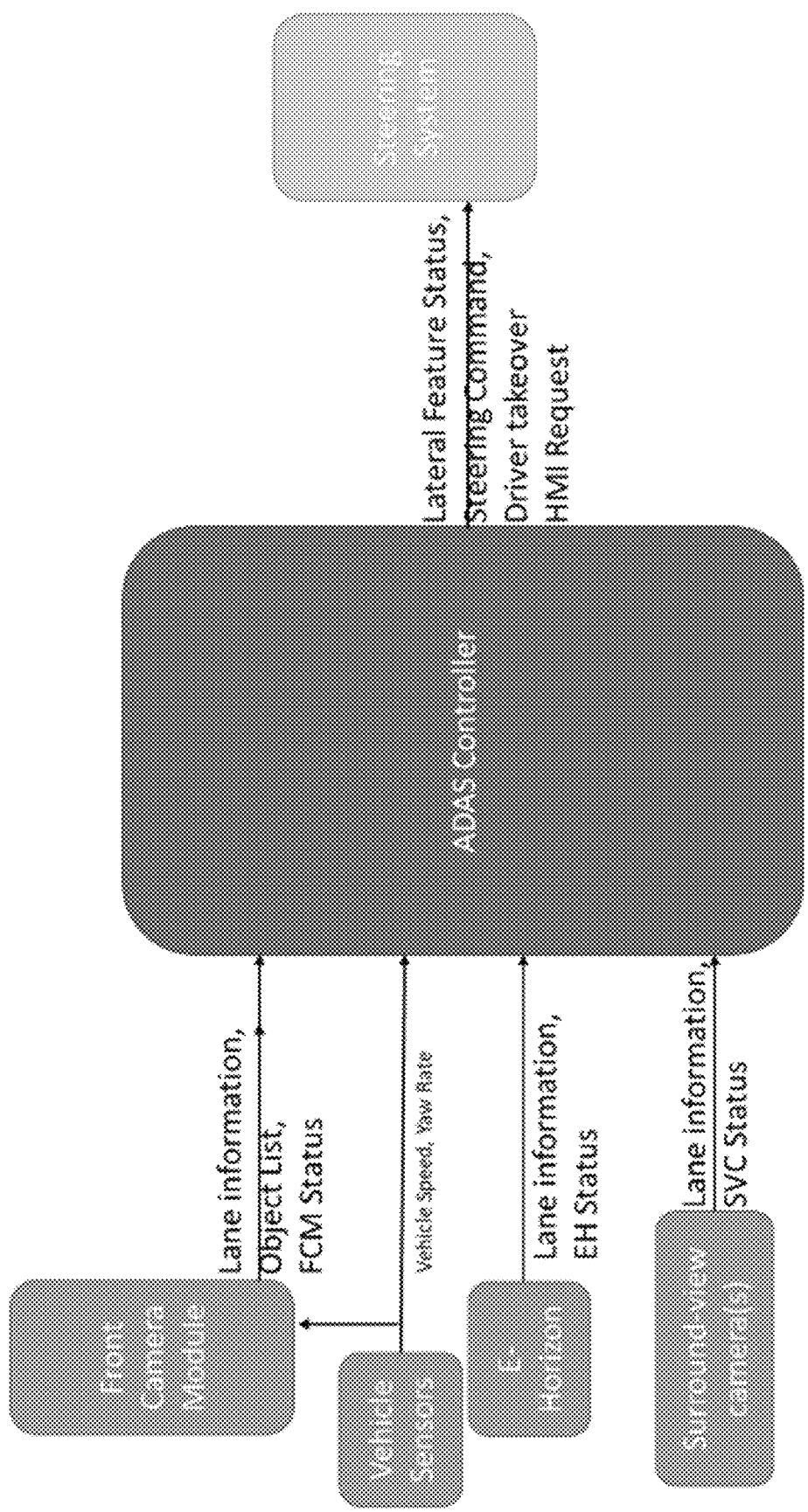
FIG. 2 is a schematic view of exemplary components of the driver assistance system of FIG. 1.

Referring now to FIG. 2, the system may include an FCM which includes a front-viewing camera and a processing unit that captures image data representative of information such as traffic lane information, an object list, status, etc. The FCM information may be considered valid when the FCM can clearly see the lanes (e.g., via lane markers or other identifying features) with high confidence and has not experienced any hardware failure. That is, the FCM may report a valid status (e.g., via an output signal or a communication bus or a watchdog signal or the like) when the FCM does not detect any failures and can detect at least the traffic lane the vehicle is travelling along (such as by detecting lane markers or road edges along at least one side of the traffic lane along which the vehicle is traveling). The system may include other vehicle sensors that capture sensor data representative of vehicle information such as vehicle speed, yaw rate, steering angle, etc.

The system may include an e-Horizon (EH) sensor or e-Horizon module (EHM) which is a predictive sensor that uses fine resolution digital maps and high-precision GPS and/or other localization solutions to anticipate the road ahead of the vehicle, effectively extending the horizon beyond what is immediately visible. The output of the EHM sensor includes traffic lane information, EHM status, etc. Like the FCM status, the EHM status may indicate if the EHM is currently outputting accurate traffic lane information and/or if the EHM sensor detects any failures or abnormalities.

A steering system may execute steering (torque or angle) commands received from the ADAS controller to laterally control the vehicle. The steering system may include electric power steering (EPS), Steer-by-wire (SbW), or hydraulic steering with an electronic control input. The ADAS controller receives sensor data and information from the various perception sensors (e.g., cameras, radar, lidar, etc.) and, based on the sensor data and a desired vehicle position within the traffic lane, calculates a steering command to laterally control the vehicle (i.e., move the vehicle toward or maintain the desired vehicle position within the lane boundaries). The ADAS controller may provide a lateral feature status that indicates to the steering system (or other systems) whether lateral control is active.

The system may also include one or more other or additional sensors (e.g., radar sensors, lidar, etc.) or cameras that sense or view the road surface either ahead of or alongside of or rearward of the equipped vehicle. For example, the system may include a plurality of surround view cameras (SVC) that capture image data for a surround view display system of the vehicle. For example, the system may include a side camera mounted at or fitted inside each of the exterior side view mirrors and viewing downward toward the road (FIG. 1). The surround view system may additionally or alternatively include a front camera fitted on the front of the vehicle with a field of view encompassing the road in front of the vehicle and/or a rear camera fitted on the rear of the vehicle with a field of view encompassing the road rearward of the vehicle. Optionally, the vehicle may not include a surround view system, whereby the rear backup camera of the vehicle may be used to capture image data representative of the road and traffic lane along which the vehicle is traveling (such as by utilizing aspects of the systems described in U.S. Pat. No. 10,583,779 and/or U.S. Publication No. US-2022-0114374, which are hereby incorporated herein by reference in their entireties). The image information from the rear backup camera and/or surround view camera(s) may be used to identify lane markings or boundaries of the roads. These cameras may have much shorter view or range compared to the FCM. Optionally, the other sensor may comprise a lidar sensor configured to sense or determine lane markers of the traffic lane along which the vehicle is traveling (such as by utilizing aspects of the systems described in U.S. Publication No. US-2022-0108117, which is hereby incorporated herein by reference in its entirety).

Figure 3:
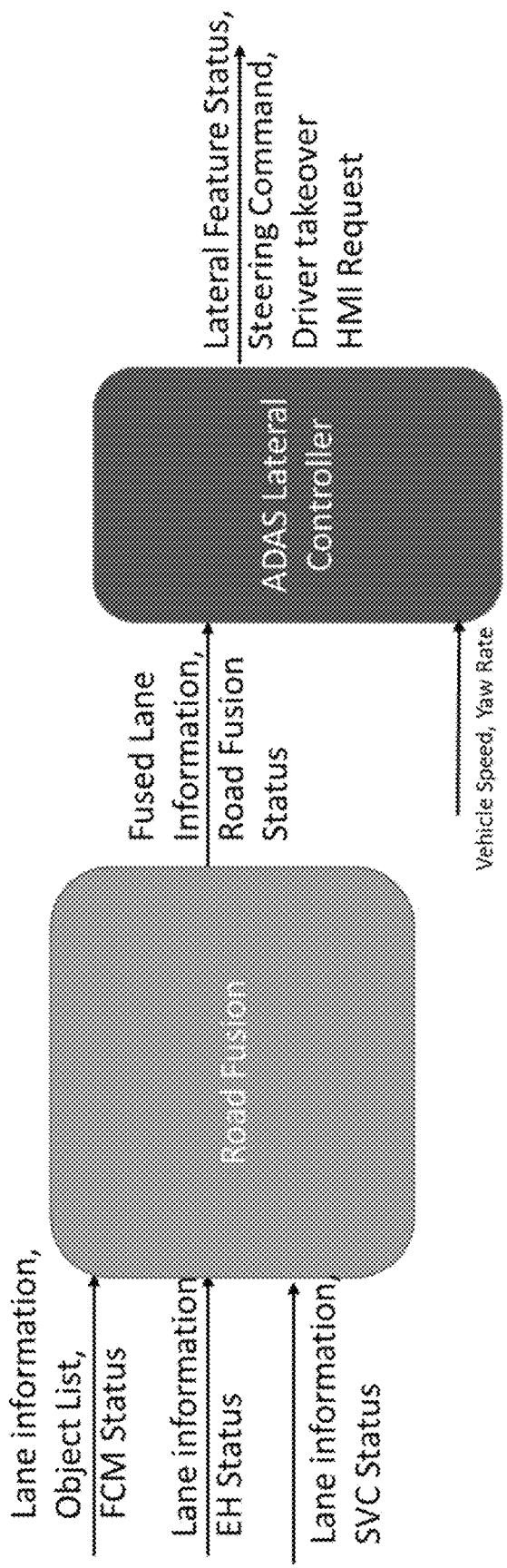
FIG. 3 is a schematic view of exemplary components of a controller of the driver assistance system of FIG. 1.

Referring now to FIG. 3, optionally, the ADAS Controller calculates the lateral control actuation command (i.e. the steering command) using road fusion. Road fusion involves obtaining information from multiple sensors (e.g., the FCM and e-Horizon sensors) and combining the information to determine more accurate information than either sensor may provide individually. Optionally, the information from the other (e.g., surround view) camera(s) may not be used for direct lateral control at higher speeds. The ADAS controller may include an ADAS lateral controller that uses the fused traffic lane information (e.g., lanemark polynomials or centerline polynomial) to calculate the steering command to keep the vehicle in the desired position within the desired traffic lane.

When the FCM degrades or fails causing loss of accurate traffic lane information, the FCM status may indicate the degraded condition and the ADAS Controller may switch to using only traffic lane information from the EHM sensor for controlling lateral movement of the vehicle. That is, when the FCM does not have the appropriate status signal, the EHM output may be used exclusively to output the fused traffic lane information from the road fusion module. In this scenario, when needed, a driver takeover request may be sent to the driver (e.g., via a visual, audible, or haptic alert) to request the driver resume lateral control of the vehicle.

The road fusion status may indicate the number of sources used to generate the output (i.e., the fused traffic lane information). For example, the road fusion status may indicate whether one, two, or more sources were fused to generate the traffic fused lane information. The system may generate the driver takeover request when the number of sensors providing valid data to be fused to generate the traffic lane information falls below a threshold number (e.g., two).

When the EHM sensor degrades or fails causing loss of accurate traffic lane information, the EHM status may indicate the degraded condition and the ADAS controller may stop using information from the EHM sensor and, for example, switch to using traffic lane information from only the FCM (and/or other sensors) to control lateral movement of the vehicle. That is, when the EHM sensor does not have the appropriate status signal (e.g., a watchdog signal halts counting), the FCM output may be used exclusively to generate the fused traffic lane information. In this scenario, when needed, a driver takeover request may be sent to the driver to request the driver resume lateral control of the vehicle.

In some situations, both the FCM status and the EHM status may indicate they are valid, but there is a significant difference in the traffic lane information provided by the sensors. For example, one of the sensors may have a latent fault (e.g., one of the sensors may be misaligned) that does not trigger the status signal, but nonetheless causes the sensor to output inaccurate traffic lane information. In this case, the ADAS controller may use the surround view cameras to calculate the host vehicle's distance from the lane markings to the left and/or right of the vehicle. The ADAS controller may use this additional information to determine which of the two primary sources (i.e., the FCM or the EHM sensor) should be trusted. That is, the ADAS controller may use information obtained from the surround view cameras to determine which source is more accurate and then begin disregarding the information from the less accurate sensor. Thus, the ADAS controller may continue to control lateral movement of the vehicle using only information from the module or sensor determined to be more accurate. In this scenario, when needed, a driver takeover request may be sent to the driver to request the driver resume lateral control of the vehicle. The system may disable the inaccurate sensor and/or prohibit fusing of the inaccurate sensor information (i.e., to keep the inaccurate sensor from "contaminating" the fused sensor data) for as long as the system determines the sensor is inaccurate.

FIG. 4 includes a table illustrating four different potential scenarios and exemplary subsequent responses (i.e., arbitration) the ADAS controller may take. The ADAS controller may continuously monitor a correlation status between the FCM and the surround view cameras. The correlation status indicates or reflects a difference between the information provided by the FCM and the SVC. For example, when the FCM outputs and the SVC outputs have a high degree of matching or similarity (i.e., the signal outputs agree), then the correlation status may be high. On the other hand, when the FCM outputs and the SVC outputs fail to have a high degree of matching or similarity (i.e., the signal outputs do not agree), then the correlation status may be low. The ADAS controller may monitor a number of correlation statuses. For example, the ADAS controller may also monitor the correlation status between the EHM sensor and the surround view camera (i.e., the difference between the information provided by the EHM sensor and the SVC). Optionally, the ADAS controller may monitor the correlation statuses only when there is a threshold difference between the traffic lane information generated by the FCM and the EH module (i.e., a difference that meets or exceeds a predetermined threshold). For example, when the FCM and the EH module are in agreement, the correlation status of the sensors with the SVC may be disregarded. When the FCM and the EH module disagree by at least a threshold amount (i.e., there is at least a threshold difference between the outputs of the signals), the ADAS controller may rely on the correlation status to determine which sensor is inaccurate.

In case 1 of FIG. 4, both the correlation status between the FMC and the SVC and between the EHM sensor and the SVC is within threshold. In this case, the ADAS controller may rely on the default source, which in this example is the FCM. However, the default source may also be a fusion of both the FCM and EHM outputs, as discussed previously. In case 2, the FMC vs SVC correlation status is outside the threshold while the EHM vs SVC correlation status is within threshold. That is, the FCM and the SVC are reporting differences in distance between one or both lane markers to a degree significant enough to satisfy the threshold. For example, the SVC may indicate the vehicle is two feet from a lane marker while the FCM indicates the vehicle is six feet from a lane marker. When the error threshold is one foot, the difference between the FCM output and the EHM output (six feet minus two feet, i.e., four feet, in this example) exceeds the threshold. In this scenario, the ADAS controller may choose to rely on only the information provided by the EHM sensor (i.e., disregard or disable the FCM output). In case 3, the FCM vs SVC correlation status is within threshold while the EHM vs SVC correlation status is outside the threshold. That is, the EHM sensor and the SVC are reporting differences in distance between one or both lane markers to a degree significant enough to satisfy the threshold. Here, the ADAS controller may only rely on the FCM information to control lateral motion of the vehicle (and disregard the EHM sensor information). In case 4, both correlation statuses are outside the threshold, and here the ADAS controller may switch to using the default sensor and/or alert the driver to take over control of lateral movement of the vehicle. Case four indicates either both the FCM and the EHM sensors have simultaneously failed and/or the SVC has failed. In either scenario, the system may immediately generate driver takeover request.

The threshold may be the same or different for both correlation statuses. The threshold may be configurable based on calibration parameters of the sensors, the capabilities of the sensors, and/or environmental conditions surrounding the vehicle.

Thus, implementations herein include a vehicle vision system and/or driver or driving assist system that controls lateral movement of the vehicle by generating steering commands using a front camera module (FCM), an e-Horizon (EH) sensor, and an ADAS controller. The system includes a steering system that controls the lateral movement of the vehicle based on received steering command when the lane keeping feature is enabled. The steering command may be a steering angle command and/or a steering torque command. The ADAS controller may generate the steering commands using a road fusion module that calculates fused traffic lane information. The ADAS controller uses the fused traffic lane information and other sensor data (vehicle speed, yaw rate, etc.) captured by various other vehicle sensors to generate a corrective steering command whenever necessary.

The road fusion module may uses traffic lane information from only the e-Horizon sensor to generate the fused traffic lane information when a status of the FCM is invalid. The road fusion module may use traffic lane information from only the FCM to generate the fused traffic lane information when a status of the e-Horizon sensor is invalid. When both the FCM and EHM sensor are valid, the road fusion module may determine an FCM vs SVC correlation status as within threshold when the difference between a SVC based lanemark position and a FCM based lanemark position does not exceed a threshold calibration value. The road fusion module may determine the correlation status is outside threshold when the difference between the SVC based lanemark position and the FCM based lanemark position exceeds the threshold calibration value. Similarly, the road fusion module may determine an EHM vs SVC correlation status as within threshold when the difference between a SVC based lanemark position and a EHM based lanemark position does not exceed a threshold calibration value, which may be the same or different than the FCM vs SVS correlation status calibration value. The road fusion model may determine the correlation status is outside threshold when the difference between the SVC based lanemark position and the EHM based lanemark position exceeds the threshold calibration value.

When the primary sensors (e.g., FCM and EHM sensors) lane information differ more than a threshold amount while both primary sensor's status (e.g., EHM status and FCM status) is valid, the ADAS controller may determine the error of each primary source via the traffic lane information from a secondary sensor (e.g., the SVS cameras or other appropriate secondary sensor). Optionally, this error is checked against another calibration value threshold. The ADAS controller may determine which primary source (i.e., the FCM or the EHM sensor) to use based on whether the correlation statuses are within or outside thresholds. For example, the ADAS controller may use the FCM information when the EHM sensor correlation status is outside the threshold and the ADAS controller may use the EHM sensor information when the FCM correlation status is outside the threshold. When the FCM and EHM lane information differ by more than a threshold amount while both EHM status and FCM Status are valid, the driver may be requested to take over the vehicle control.

The system may incorporate aspects of the systems described in U.S. Publication Nos. US-2022-0176960; US-2022-0048509 and/or U.S. patent application Ser. No. 17/662,465, filed May 9, 2022, and/or U.S. patent application Ser. No. 17/808,386, filed Jun. 23, 2022, which are hereby incorporated herein by reference in their entireties. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, more preferably at least 500,000 photosensor elements or pixels and more preferably at least one million photosensor elements or pixels, arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assistance system, the vehicular driver assistance system comprising:
   a front camera module (FCM) disposed at a vehicle equipped with the vehicular driver assistance system and viewing exterior of the equipped vehicle, the FCM comprising a camera, the camera capturing image data;
   an image processor for processing image data captured by the camera, wherein the vehicular driver assistance system, responsive to processing at the image processor of image data captured by the camera, generates FCM lane information comprising information regarding a traffic lane along which the equipped vehicle is traveling;
   an e-Horizon module (EHM) comprising one or more localization sensors, wherein the EHM uses map data to anticipate a road ahead of the equipped vehicle, and wherein the EHM generates EHM lane information comprising information regarding the traffic lane along which the equipped vehicle is traveling;
   at least one secondary sensor disposed exterior of the equipped vehicle and at least partially sensing the traffic lane along which the equipped vehicle is traveling, the at least one secondary sensor capturing secondary sensor data;
   wherein the vehicular driver assistance system determines an FCM correlation using the generated FCM lane information and the secondary sensor data captured by the at least one secondary sensor, the FCM correlation indicating a difference between the generated FCM lane information and the secondary sensor data;
   wherein the vehicular driver assistance system determines an EHM correlation using the generated EHM lane information and the secondary sensor data captured by the at least one secondary sensor, the EHM correlation indicating a difference between the generated EHM lane information and the secondary sensor data;
   wherein, responsive to the FCM correlation satisfying an FCM correlation threshold, the vehicular driver assistance system controls lateral movement of the equipped vehicle based at least in part on the generated FCM lane information; and
   wherein, responsive to the EHM correlation satisfying an EHM correlation threshold, the vehicular driver assistance system controls lateral movement of the equipped vehicle based at least in part on the generated EHM lane information.

2. The vehicular driver assistance system of claim 1, wherein the vehicular driver assistance system controls the lateral movement of the equipped vehicle by generating at least one selected from the group consisting of (i) a steering angle command and (ii) a steering torque command.

3. The vehicular driver assistance system of claim 1, wherein the FCM outputs an FCM status signal indicating a validity of the generated FCM lane information, and wherein the vehicular driver assistance system, responsive to determining that that the FCM status signal indicates the generated FCM lane information is invalid, controls lateral movement of the equipped vehicle based on the generated EHM lane information.

4. The vehicular driver assistance system of claim 1, wherein the EHM outputs an EHM status signal indicating a validity of the generated EHM lane information, and wherein the vehicular driver assistance system, responsive to determining that that the EHM status signal indicates the generated EHM lane information is invalid, controls lateral movement of the equipped vehicle based on the generated FCM lane information.

5. The vehicular driver assistance system of claim 1, wherein the vehicular driver assistance system, responsive to the EHM correlation failing to satisfy the EHM correlation threshold, controls lateral movement of the equipped vehicle using the generated FCM lane information.

6. The vehicular driver assistance system of claim 1, wherein the vehicular driver assistance system, responsive to determining that the FCM correlation failing to satisfy the FCM correlation threshold, controls lateral movement of the equipped vehicle using the generated EHM lane information.

7. The vehicular driver assistance system of claim 1, wherein the vehicular driver assistance system determines, based on the generated FCM lane information, a first distance between the equipped vehicle and a lane marker of the traffic lane along which the equipped vehicle is traveling, and wherein the vehicular driver assistance system determines, based on the secondary sensor data captured by the at least one secondary sensor, a second distance between the equipped vehicle and the lane marker of the traffic lane along which the equipped vehicle is traveling, and wherein the FCM correlation is based on a difference between the first distance and the second distance.

8. The vehicular driver assistance system of claim 1, wherein the vehicular driver assistance system determines, based on the generated EHM lane information, a first distance between the equipped vehicle and a lane marker of the traffic lane along which the equipped vehicle is traveling, and wherein the vehicular driver assistance system determines, based on the secondary sensor data captured by the at least one secondary sensor, a second distance between the equipped vehicle and the lane marker of the traffic lane along which the equipped vehicle is traveling, and wherein the EHM correlation is based on a difference between the first distance and the second distance.

9. The vehicular driver assistance system of claim 1, wherein the vehicular driver assistance system determines the FCM correlation and the EHM correlation in response to determining a difference between the generated FCM lane information and the generated EHM lane information exceeds a threshold.

10. The vehicular driver assistance system of claim 1, wherein the at least one secondary sensor comprises a second camera.

11. The vehicular driver assistance system of claim 1, wherein the at least one secondary sensor comprises at least one camera of a surround view camera (SVC) system of the equipped vehicle.

12. The vehicular driver assistance system of claim 1, comprising an electronic control unit (ECU) comprising electronic circuitry and associated software.

13. The vehicular driver assistance system of claim 12, wherein the electronic circuitry includes a data processor for processing secondary sensor data captured by the at least one secondary sensor, and wherein the vehicular driver assistance system determines the FCM correlation using the generated FCM lane information and via processing at the ECU of the secondary sensor data captured by the at least one secondary sensor, and wherein the vehicular driver assistance system determines the EHM correlation using the generated EHM lane information and via processing at the ECU of the secondary sensor data captured by the at least one secondary sensor.

14. The vehicular driver assistance system of claim 12, wherein the electronic circuitry of the ECU includes the image processor.

15. The vehicular driver assistance system of claim 1, wherein the FCM comprises the image processor.

16. A vehicular driver assistance system, the vehicular driver assistance system comprising:
a front camera module (FCM) disposed at a vehicle equipped with the vehicular driver assistance system and viewing exterior of the equipped vehicle, the FCM comprising a camera, the camera capturing image data;
an image processor for processing image data captured by the camera, wherein the vehicular driver assistance system, responsive to processing at the image processor of image data captured by the camera, generates FCM lane information comprising information regarding a traffic lane along which the equipped vehicle is traveling;
an e-Horizon module (EHM) comprising one or more localization sensors, wherein the EHM uses map data to anticipate a road ahead of the equipped vehicle, and wherein the EHM generates EHM lane information comprising information regarding the traffic lane along which the equipped vehicle is traveling;
at least one secondary sensor comprising a surround view camera (SCV) disposed at an exterior side mirror of the equipped vehicle and at least partially sensing the traffic lane along which the equipped vehicle is traveling, the at least one secondary sensor capturing secondary sensor data;
wherein the vehicular driver assistance system determines an FCM correlation using the generated FCM lane information and the secondary sensor data captured by the at least one secondary sensor, the FCM correlation indicating a difference between the generated FCM lane information and the secondary sensor data;
wherein the vehicular driver assistance system determines an EHM correlation using the generated EHM lane information and the secondary sensor data captured by the at least one secondary sensor, the EHM correlation indicating a difference between the generated EHM lane information and the secondary sensor data;
wherein, responsive to the FCM correlation failing to satisfy an FCM correlation threshold, the vehicular driver assistance system controls lateral movement of the equipped vehicle based on the generated EHM lane information; and
wherein, responsive to the EHM correlation failing to satisfy an EHM correlation threshold, the vehicular driver assistance system controls lateral movement of the equipped vehicle based on the generated FCM lane information.

17. The vehicular driver assistance system of claim 16, wherein the vehicular driver assistance system controls the lateral movement of the equipped vehicle by generating at least one selected from the group consisting of (i) a steering angle command and (ii) a steering torque command.

18. The vehicular driver assistance system of claim 16, wherein the vehicular driver assistance system determines, based on the generated FCM lane information, a first distance between the equipped vehicle and a lane marker of the traffic lane along which the equipped vehicle is traveling, and wherein the vehicular driver assistance system determines, based on the secondary sensor data captured by the at least one secondary sensor, a second distance between the equipped vehicle and the lane marker of the traffic lane along which the equipped vehicle is traveling, and wherein the FCM correlation is based on a difference between the first distance and the second distance.

19. The vehicular driver assistance system of claim 16, wherein the vehicular driver assistance system determines, based on the generated EHM lane information, a first distance between the equipped vehicle and a lane marker of the traffic lane along which the equipped vehicle is traveling, and wherein the vehicular driver assistance system determines, based on the secondary sensor data captured by the at least one secondary sensor, a second distance between the equipped vehicle and the lane marker of the traffic lane along which the equipped vehicle is traveling, and wherein the EHM correlation is based on a difference between the first distance and the second distance.

20. A vehicular driver assistance system, the vehicular driver assistance system comprising:
a front camera module (FCM) disposed at a vehicle equipped with the vehicular driver assistance system and viewing exterior of the equipped vehicle, the FCM comprising a camera, the camera capturing image data;
an electronic control unit (ECU) comprising electronic circuitry and associated software, wherein the electronic circuitry comprises an image processor for processing image data captured by the camera, and wherein the vehicular driver assistance system, responsive to processing at the image processor of image data captured by the camera, generates FCM lane information comprising information regarding a traffic lane along which the equipped vehicle is traveling;

an e-Horizon module (EHM) comprising one or more localization sensors, wherein the EHM uses map data to anticipate a road ahead of the equipped vehicle, and wherein the EHM generates EHM lane information comprising information regarding the traffic lane along which the equipped vehicle is traveling;

a plurality of secondary sensors disposed exterior of the equipped vehicle and at least partially sensing the traffic lane along which the equipped vehicle is traveling, the plurality of secondary sensors capturing secondary sensor data;

wherein the vehicular driver assistance system determines an FCM correlation using the generated FCM lane information and the secondary sensor data captured by the plurality of secondary sensors, the FCM correlation indicating a difference between the generated FCM lane information and the secondary sensor data;

wherein the vehicular driver assistance system determines an EHM correlation using the generated EHM lane information and the secondary sensor data captured by the plurality of secondary sensors, the EHM correlation indicating a difference between the generated EHM lane information and the secondary sensor data;

wherein, responsive to the FCM correlation satisfying an FCM correlation threshold, the vehicular driver assistance system controls lateral movement of the equipped vehicle based at least in part on the generated FCM lane information; and wherein, responsive to the EHM correlation satisfying an EHM correlation threshold, the vehicular driver assistance system controls lateral movement of the equipped vehicle based at least in part on the generated EHM lane information.

21. The vehicular driver assistance system of claim 20, wherein the FCM outputs an FCM status signal indicating a validity of the generated FCM lane information, and wherein the vehicular driver assistance system, responsive to determining that that the FCM status signal indicates the generated FCM lane information is invalid, controls lateral movement of the equipped vehicle based on the generated EHM lane information.

22. The vehicular driver assistance system of claim 20, wherein the EHM outputs an EHM status signal indicating a validity of the generated EHM lane information, and wherein the vehicular driver assistance system, responsive to determining that that the EHM status signal indicates the generated EHM lane information is invalid, controls lateral movement of the equipped vehicle based on the generated FCM lane information.

23. The vehicular driver assistance system of claim 20, wherein the vehicular driver assistance system, responsive to the EHM correlation failing to satisfy the EHM correlation threshold, controls lateral movement of the equipped vehicle using the generated FCM lane information.

24. The vehicular driver assistance system of claim 20 wherein the vehicular driver assistance system, responsive to the FCM correlation failing to satisfy the FCM correlation threshold, controls lateral movement of the equipped vehicle using the generated EHM lane information.

\* \* \* \* \*

UNITED STATES PATENT AND TRADEMARK OFFICE
CERTIFICATE OF CORRECTION

| | | |
|---|---|---|
| PATENT NO. | : 12,311,930 B2 | Page 1 of 1 |
| APPLICATION NO. | : 17/811312 | |
| DATED | : May 27, 2025 | |
| INVENTOR(S) | : Alan M. Cordeiro et al. | |

It is certified that error appears in the above-identified patent and that said Letters Patent is hereby corrected as shown below:

In the Claims

Column 10
Claim 6, Lines 51-52, "responsive to determining that the FCM" should be --responsive to the FCM--

Column 14
Claim 24, Line 26, "claim 20" should be --claim 20,--

Signed and Sealed this
Twenty-fourth Day of June, 2025

Coke Morgan Stewart
*Acting Director of the United States Patent and Trademark Office*